US012086237B2

(12) United States Patent
Cohen et al.

(10) Patent No.: US 12,086,237 B2
(45) Date of Patent: Sep. 10, 2024

(54) SECURELY REDIRECTING SYSTEM SERVICE ROUTINES

(71) Applicant: Microsoft Technology Licensing, LLC, Redmond, WA (US)

(72) Inventors: Haim Cohen, Bothell, WA (US); Graham John Harper, Cheltenham (GB); Mehmet Iyigun, Kirkland, WA (US); Kenneth D. Johnson, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 339 days.

(21) Appl. No.: 17/557,643

(22) Filed: Dec. 21, 2021

(65) Prior Publication Data

US 2023/0128720 A1   Apr. 27, 2023

Related U.S. Application Data

(60) Provisional application No. 63/270,269, filed on Oct. 21, 2021.

(51) Int. Cl.
  *G06F 21/51*   (2013.01)
  *G06F 21/31*   (2013.01)
  (Continued)

(52) U.S. Cl.
  CPC ............. *G06F 21/54* (2013.01); *G06F 21/31* (2013.01); *G06F 21/64* (2013.01); *G06F 21/79* (2013.01)

(58) Field of Classification Search
  CPC .......... G06F 21/54; G06F 21/31; G06F 21/64; G06F 21/79; G06F 21/51; G06F 21/52; G06F 21/53; G06F 21/57
  See application file for complete search history.

(56) References Cited

U.S. PATENT DOCUMENTS 7,552,479 B1 * 6/2009 Conover ............... G06F 21/565
                                                          713/164
8,813,069 B2 * 8/2014 Schneider ........... G06F 9/45558
                                                          718/1

(Continued)

OTHER PUBLICATIONS

"International Search Report and Written Opinion Issued in PCT Application No. PCT/US22/038416", Mailed Date: Oct. 19, 2022, 13 Pages.

*Primary Examiner* — Joseph P Hirl
*Assistant Examiner* — Aayush Aryal
(74) *Attorney, Agent, or Firm* — Workman Nydegger

(57) ABSTRACT

Securely redirecting a system service routine via a provider service table. A service call provider is loaded within an operating system executing in a lower trust security zone. The service call provider comprises metadata indicating a system service routine to be redirected to the service call provider. Based on the metadata, a provider service table is built within a higher trust security zone. The service table redirects the system service routine to the service call provider. Memory page(s) associated with the provider service table are hardware protected, and a read-only view is exposed to the operating system. The provider service table is associated with a user-mode process. A service call for a particular system service routine is received by the operation system from the user-mode process and, based on the provider service table being associated with the user-mode process, the service call is directed to the service call provider.

20 Claims, 3 Drawing Sheets

(51) Int. Cl.
*G06F 21/52* (2013.01)
*G06F 21/53* (2013.01)
*G06F 21/54* (2013.01)
*G06F 21/57* (2013.01)
*G06F 21/64* (2013.01)
*G06F 21/79* (2013.01)

(56) References Cited

U.S. PATENT DOCUMENTS

| | | |
|---|---|---|
| 8,875,295 B2 | 10/2014 | Lutas et al. |
| 9,117,080 B2 | 8/2015 | Lukacs et al. |
| 2014/0245444 A1* | 8/2014 | Lutas .................. H04L 63/1441 726/24 |

* cited by examiner

SECURELY REDIRECTING SYSTEM SERVICE ROUTINES

CROSS-REFERENCE TO RELATED APPLICATIONS

This application claims priority to, and the benefit of, U.S. Provisional Patent Application Ser. No. 63/270,269 filed Oct. 21, 2021, and entitled "SECURELY REDIRECTING SYSTEM SERVICE ROUTINES," and which application is expressly incorporated herein by reference in its entirety.

TECHNICAL FIELD

The present disclosure relates to systems, methods, and devices that manage a system service table for system call redirection.

BACKGROUND

Operating systems, such as WINDOWS, LINUX, MACOS, etc., provide a variety of system service calls that are callable by user-mode processes in order to request services from the operating system—such as to open a file, to request a memory allocation, etc. An operating system maintains at least one system service table (e.g., a system service descriptor table in WINDOWS) within kernel memory. System service tables map system service calls to kernel function addresses.

BRIEF SUMMARY

At least some embodiments described herein are directed to secured system service redirection technology that enables an operating system to securely reroute operating system service calls to verified service call providers that are registered with the operating system. In embodiments, these service call providers are dynamically and securely loaded into the operating system, and offer value-add services such as system call monitoring, system call filtering, system call sandboxing, and the like.

In some aspects, the techniques described herein relate to a method, implemented at a computer system that includes a processor, for securely redirecting a system service routine via a provider service table, the method including: loading a service call provider within an operating system executing in a lower trust security zone, the service call provider including provider metadata indicating a set of system service routines to be redirected to the service call provider; based at least on a call from the operating system to a secure operating system within a higher trust security zone: building a provider service table redirecting a system service routine in the set of system service routines to the service call provider, hardware protecting a memory page associated with the provider service table, and exposing a read-only view of the provider service table to the operating system; associating the provider service table with a user-mode process executing in the lower trust security zone; and based at least on receiving a service call for a particular system service routine from the user-mode process: determining that the provider service table is associated with the user-mode process, identifying the particular system service routine within the provider service table, and directing the service call to the service call provider.

In some aspects, the techniques described herein relate to a computer system for securely redirecting a system service routine via a provider service table, including: a processor; and a hardware storage device that stores computer-executable instructions that are executable by the processor to cause the computer system to: load a service call provider within an operating system executing in a lower trust security zone, the service call provider including provider metadata indicating a set of system service routines to be redirected to the service call provider; based at least on a call from the operating system to a secure operating system within a higher trust security zone: build a provider service table redirecting a system service routine in the set of system service routines to the service call provider, hardware protect a memory page associated with the provider service table, and expose a read-only view of the provider service table to the operating system; associate the provider service table with a user-mode process executing in the lower trust security zone; and based at least on receiving a service call for a particular system service routine from the user-mode process: determine that the provider service table is associated with the user-mode process, identify the particular system service routine within the provider service table, and direct the service call to the service call provider.

In some aspects, the techniques described herein relate to a computer program product including a hardware storage device that stores computer-executable instructions that are executable by a processor to cause a computer system to securely redirect a system service routine via a provider service table, the computer-executable instructions including instructions that are executable by the processor to cause the computer system to: load a service call provider within an operating system executing in a lower trust security zone, the service call provider including provider metadata indicating a set of system service routines to be redirected to the service call provider; based at least on a call from the operating system to a secure operating system within a higher trust security zone: build a provider service table redirecting a system service routine in the set of system service routines to the service call provider, hardware protect a memory page associated with the provider service table, and expose a read-only view of the provider service table to the operating system; associate the provider service table with a user-mode process executing in the lower trust security zone; and based at least on receiving a service call for a particular system service routine from the user-mode process: determine that the provider service table is associated with the user-mode process, identify the particular system service routine within the provider service table, and direct the service call to the service call provider.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

System service tables provided by operating systems map system service calls (service calls) to kernel function addresses. Currently, software vendors (e.g., antivirus, security) wishing to intercept system service calls resort to "hooking" system service tables. This involves modifying system service table(s) in order to direct service calls to function addresses within their own software components, rather than to the kernel function addresses to which they were originally intended by the operating system vendor. This can be unsafe, unsupported, and unsecure to the point where some operating systems take active steps to prevent modification of their system service table(s).

Described herein is secured system service redirection technology that solves the disadvantages of "hooking" system service tables, by enabling an operating system to securely reroute operating system service calls to verified service call providers that are registered with the operating system. Service call providers are dynamically and securely loaded into the operating system, and offer value-add services such as system call monitoring, system call filtering, system call sandboxing, anti-malware monitoring, and the like. Embodiments allow verified service call providers to register alternate service tables within an operating system, and ensure that service calls dispatched through these tables are done so in a secure manner.

It has been a consensus amongst engineers that supporting the redirection of system service calls would be subject to abuse, and therefore poses a significant security risk. These concerns largely stem from difficulties surrounding verification of redirected service call targets, and the prevention of data structure modification critical to supporting the feature. As is described herein, the inventors have overcome these security concerns through the use of virtualization-based security, in order to validate and maintain provider service tables in a tamper-proof manner.

Figure 1:
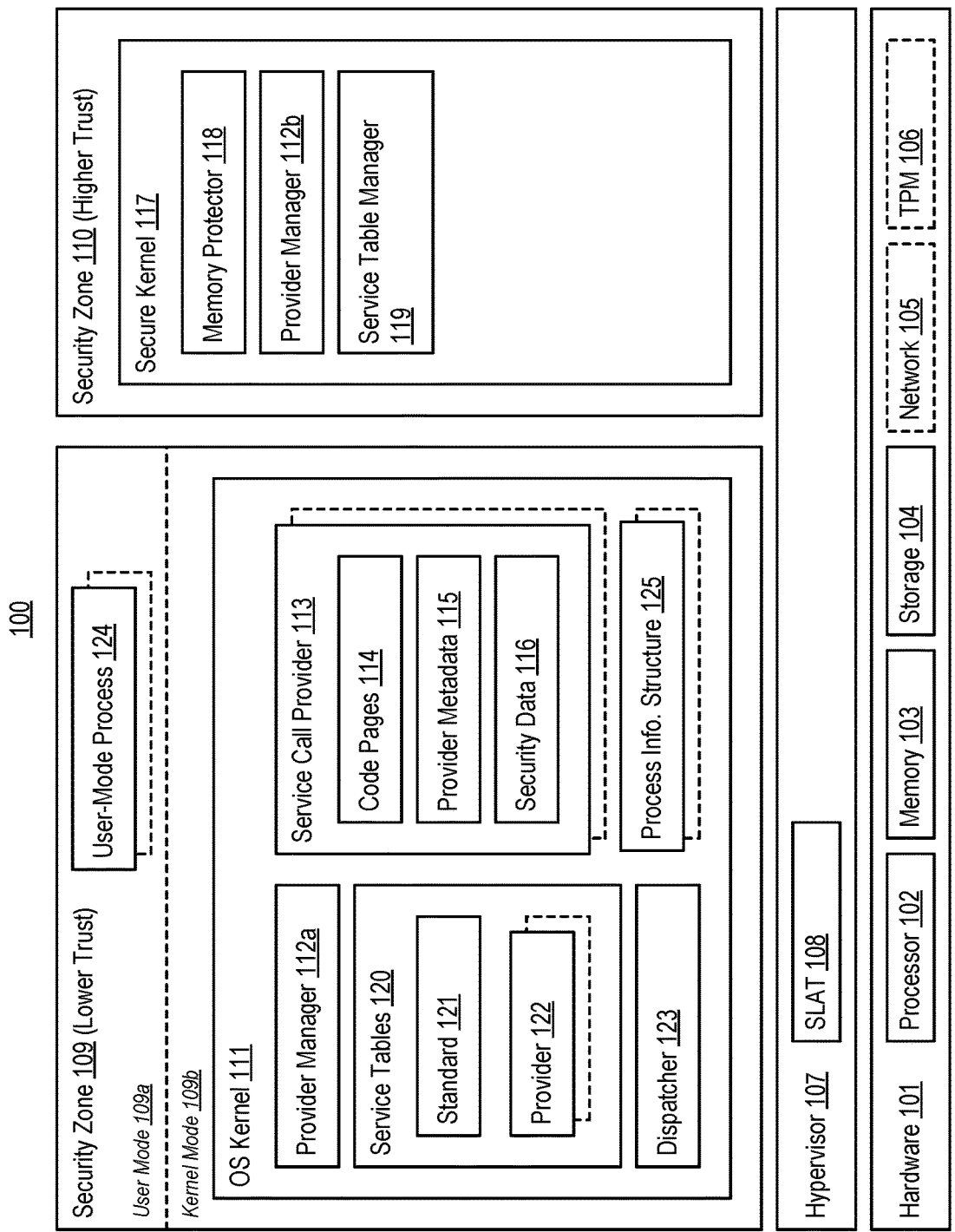
FIG. 1 illustrates an example computer architecture that facilitates securely redirecting system service routines via provider service tables.

FIG. 1 illustrates an example computer system 100 that facilitates securely redirecting system service routines via provider service tables. As shown, computer system 100 includes a variety of computing hardware 101, including one or more processors (including processor 102), memory 103 (e.g., main memory, such as random-access memory), and storage 104 (e.g., disk storage, ROM). Computing hardware 101, may also include, for example, a network adapter (network 105), a Trusted Platform Module (TPM) 106, etc.

In FIG. 1, the computing hardware 101 executes a hypervisor 107. The hypervisor 107, in turn, creates at least two security zones (e.g., partitions, virtual machines), including at least a lower-trust security zone (security zone 109), and a higher-trust security zone (security zone 110). In an example, the hypervisor 107 implements Virtual Secure Mode (VSM) from MICROSOFT CORPORATION, and each hypervisor-created security zone corresponds to a different Virtual Trust Level (VTL)—e.g., VTL0 for security zone 109 and VTL1 for security zone 110. In FIG. 1, security zone 109 includes a user mode 109a (within which one or more user-mode processes execute, including user-mode process 124) and a kernel mode 109b (within which an OS kernel 111 executes), while a secure kernel 117 executes within security zone 110. In this particular example, an NT kernel (e.g., OS kernel 111) runs in VTL0 (security zone 109) with user-mode software executing on top of the NT kernel, while a Secure Kernel runs in VTL1 (security zone 110).

The secure kernel 117 comprises a memory protector 118, which operates to apply read-only memory protections to allocations from memory 103. In some embodiments, the memory protector 118 accomplishes these protections based, at least in part, on a hardware-based memory protection technology, such by managing memory page permissions via use of Second Level Address Translation (SLAT) 108 features provided by processor 102 and managed by the hypervisor 107. In an example, the memory protector 118 implements Hypervisor Code Integrity (HVCI), which is usable to read-only protect memory allocated to the NT kernel (e.g., driver code pages, service tables). For example, the OS kernel 111 is shown as comprising services tables 120, the underlying memory pages of which are read-only protected by the memory protector 118.

While computer system 100 comprises a standard service table 121 (e.g., a system service descriptor table), embodiments allow each of one or more service call providers (e.g., service call provider 113) to provide and register a provider service table 122. Embodiments also ensure that service calls received from user-mode processes (e.g., user-mode process 124) registered to the service call provider 113 are dispatched by a dispatcher 123 through the provider service table 122 (rather than the standard service table 121) in a secure manner.

Figure 2:
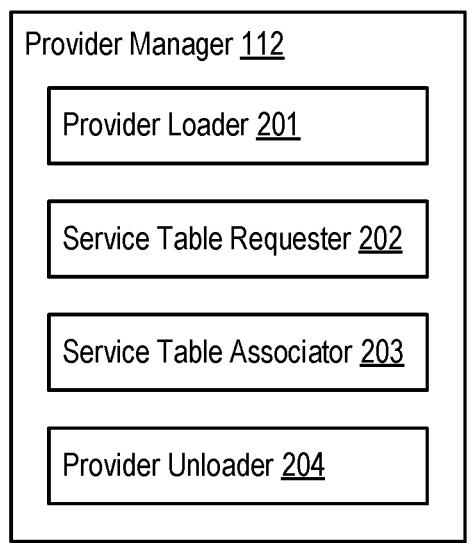
FIG. 2 illustrates an example of components of a service call provider manager.

To accomplish the foregoing, computer system 100 includes a service call provider manager (provider manager 112). As shown, in embodiments the provider manager 112 comprises one or more portions, such as a first portion (i.e., provider manager 112a) within the OS kernel 111 and/or a second portion (i.e., provider manager 112b) within the secure kernel 117. FIG. 2 illustrates example components (e.g., provider loader 201, service table requester 202, service table associator 203, provider unloader 204) of provider manager 112. Each of these components represents example functionality provided by the provider manager 112, and in various embodiments portions of these components exist at one, or both, of provider manager 112a or provider manager 112b. It will be appreciated that the depicted components are presented merely as an aid in describing various embodiments, and that these components are non-limiting to how software and/or hardware might implement various embodiments described herein, or of the particular functionality of the provider manager 112.

In embodiments, the provider loader 201 loads a service call provider 113 into a memory space of the OS kernel 111. In embodiments, the provider loader 201 verifies the security and/or the origin of the service call provider 113 prior to loading the service call provider 113 into the memory space of the OS kernel 111. As shown, the service call provider 113 includes (or is otherwise associated with) security data 116. In embodiments, this security data 116 includes one or more of: a signature (e.g., over one or more of: code pages 114, provider metadata 115) from an issuing authority (e.g., a vendor of the OS kernel 111), an indication of a publishing authority (e.g., a vendor of the OS kernel 111, or a verified third party), a signature of a publishing authority, an attested-to security status of the service call provider 113, and the like. In embodiments, verifying the service call provider 113 includes the provider loader 201 verifying this security data 116.

In embodiments, there are respective portions of the provider loader 201 at the provider manager 112a in the OS kernel 111 and at the provider manager 112b in the secure kernel 117, such that the OS kernel 111 and the secure kernel 117 cooperate when loading the service call provider 113. Thus, in embodiments, the security data 116 can be at least partially verified by one, or both, of (i) a first portion of the provider loader 201 at the provider manager 112a (i.e., within the OS kernel 111), or a (ii) second portion of the provider loader 201 at the provider manager 112b (i.e., within the secure kernel 117 and security zone 110). It is noted that, when verifying the security data 116 by a portion of the provider loader 201 at the provider manager 112b, the secure kernel 117 can ensure only service call providers that are trusted by the secure kernel 117 can be loaded.

In embodiments, the provider loader 201 also operates to read-only protect code pages 114 of the service call provider 113 within a memory space of the OS kernel 111. For example, a portion of the provider loader 201 at the provider manager 112b interacts with the memory protector 118 to read-only protect code pages 114, as they are exposed to the OS kernel 111.

As shown, the service call provider 113 includes provider metadata 115. In embodiments, the provider metadata 115 defines a set of system service routines as being associated with the service call provider 113. In embodiments, for at least one system service routine in this set, the provider metadata 115 indicates a function at the service call provider 113 (e.g., within code pages 114) to which the system service routine should be redirected (e.g., via a function address). In embodiments, for at least one system service routine in this set, the provider metadata 115 indicates that the system service routine should be handled by the OS kernel 111 (even though the service routine is associated with the service call provider 113).

In some embodiments, the set of system service routines associated with the service call provider 113 includes all system service routines that are available from the OS kernel 111. In other embodiments, the set of system service routines associated with the service call provider 113 is a subset of system service routines, which excludes one or more system service routines that are otherwise available from the OS kernel 111. In some embodiments, any system service routine that is available from the OS kernel 111, and that is not specifically identified in the provider metadata 115, is excluded from the set of system service routines associated with the service call provider 113, such that the exclusion is implicit. In some embodiments, the provider metadata 115 expressly specifies one or more system service routines that are available from the OS kernel 111, and that are excluded from the set of system service routines associated with the service call provider 113, such that the exclusion is explicit. In some embodiments, the provider metadata 115 defines one or more policies to be applied to any excluded system service routine(s), such as a first policy that calls to such system service routine(s) should be blocked, a second policy that calls to such system service routine(s) should return failure, etc.

In embodiments, when loading the service call provider 113, the provider loader 201 (e.g., a portion at the provider manager 112b) parses and verifies this provider metadata 115. In embodiments, when parsing/verifying the provider metadata 115, the provider loader 201 ensures that any system service routine specified in the provider metadata 115 corresponds to a valid system service routine (e.g., provided by the OS kernel 111), that any system service routine specified in the provider metadata 115 is permitted to be redirected to a service call provider, that a function identified in the provider metadata 115 actually exists in the code pages 114, etc. Notably, embodiments take advantage of the fact that, when loading a driver (e.g., service call provider 113), a driver image mapped in the secure kernel 117 can be safely parsed free of any potential modifications made by code running in security zone 109 (e.g., due to action of the memory protector 118). This ensures the integrity of the provider metadata 115 read during the loading of the service call provider 113.

In embodiments, the service table requester 202 initiates a request, from the OS kernel 111 to the secure kernel 117, that causes a service table manager 119 to build a provider service table (e.g., provider service table 122) on behalf of the service call provider 113, based on the set of system service routines identified in the provider metadata 115, and/or based on a policy defined in the provider metadata 115. In embodiments, there are respective portions of the service table requester 202 at the provider manager 112a in the OS kernel 111 and at the provider manager 112b in the secure kernel 117, and this request is between these portions of the service table requester 202. In some embodiments, the service table requester 202 initiates this request as part of loading the service call provider 113 by the provider loader 201. In some embodiments, the service table requester 202 initiates this request based on a request by the service call provider 113, after loading of the service call provider 113. In some embodiments, the service table requester 202 initiates this request based on a request from user-mode process 124.

In embodiments, the service table manager 119 builds the provider service table 122 by creating an entry for each system service routine in the set of system service routines associated with the service call provider 113, as defined in the provider metadata 115. In embodiments, each entry in the provider service table 122 maps a corresponding system service routine to a function (e.g., specified in the provider metadata 115) within the code pages 114 of the service call provider 113 (i.e., when redirecting the system service routine to the service call provider 113), or to a function within the OS kernel 111 (i.e., when the OS kernel 111 is to handle the system service routine). As discussed, in some embodiments, the set of system service routines associated with the service call provider 113 is a subset of system service routines, which excludes one or more system service routines that are otherwise available from the OS kernel 111. Thus, in embodiments, the provider service table 122 excludes any system service routine available from the OS kernel 111 that excluded (either implicitly or explicitly) from the set of system service routines associated with the service call provider 113.

In embodiments, the service table manager 119 builds the provider service table 122 by creating an entry for at least one system service routine that was implicitly or explicitly excluded from the set of system service routines associated with the service call provider 113. In these embodiments, the service table manager 119 configures the entry according to a policy defined in the provider metadata 115, such as a policy to block a corresponding system service routine, to a policy return failure in response to a call to a corresponding system service routine, etc.

In embodiments, the service table manager 119 exposes the provider service table 122 to the OS kernel 111. In embodiments, the service table requester 202 operates to read-only protect memory pages associated with this provider service table 122 within security zone 109. For example, a portion of the service table requester 202 at the provider manager 112*b* interacts with the memory protector 118 to read-only protect memory pages storing the provider service table 122.

In embodiments, the service table associator 203 associates a provider service table (e.g., provider service table 122) exposed to the OS kernel 111 with one or more user-mode processes (e.g., user-mode process 124). In embodiments, this association is accomplished by updating a process information data structure to identify the provider service table. For example, FIG. 1 shows that the OS kernel 111 includes one or more process information data structures (e.g., process information structure 125, corresponding to user-mode process 124). In embodiments, the service table associator 203 updates process information structure 125 to include an identifier of the provider service table 122 (e.g., an index of provider service table 122 within an array that identifies each service table in services tables 120), and the dispatcher 123 uses this process information structure 125 to determine the destination of a service call received from user-mode process 124. However, it will be appreciated by one of ordinary skill in the art that many mechanisms for associating a user-mode processes with a provider service table could be utilized. In embodiments, once a provider service table is associated with a user-mode process (e.g., via associating an array index with the user-mode process), the dispatcher 123 processes any service calls received from that user-mode process via the associated provider service table (rather than the standard service table 121). Thus, in embodiments, the user-mode process is sandboxed in the service calls that it can make, since it is permitted to make service calls to only system service routines that are included in its associated provider service table.

In some embodiments, the service table associator 203 operates in response to a request from a user-mode process, or any entity that has write access to the user-mode process (e.g., a parent process, a driver, a service call provider). For example, based on a request from user-mode process 124 to the provider manager 112, or based on a request from service call provider 113 to the provider manager 112, the service table associator 203 associates the user-mode process 124 with provider service table 122. Thus, in embodiments, association of a user-mode process with a provider service table is an opt-in process.

In some embodiments, the service table associator 203 operates based on a decision by the provider manager 112 and/or another component of the OS kernel 111. Thus, in embodiments, association of a user-mode process with a provider service table is compulsory.

In either case, association of a user-mode process with a provider service table is useful for sandboxing that user-mode process (i.e., to limit that process to use of a subset of system service calls that are defined in the associated provider service table), and/or for processing that process' system calls via the service call provider 113 (e.g., to provide system call monitoring, system call filtering, system call logging, anti-malware monitoring, etc.).

In embodiments, the provider unloader 204 unloads the service call provider 113, including unloading the provider service table 122 associated with the service call provider 113. In embodiments, the provider unloader 204 unloads the service call provider 113 only when there are no user-mode processes associated with the service call provider 113. Thus, in embodiments, an unload request (e.g., by the service call provider 113) is blocked until all processes associated with the service call provider 113 have terminated. In embodiments, the provider unloader 204 unloads the service call provider 113 in order to update the service call provider 113, to remove the service call provider 113, or for other reasons.

Embodiments are now further described in connection with FIG. 3, which illustrates a flow chart of an example method 300 for securely redirecting a system service routine via a provider service table. In embodiments, instructions for implementing method 300 are encoded as computer-executable instructions stored on a computer program product (e.g., a hardware storage device, such as storage 104) that are executable by a processor (e.g., processor 102) to cause a computer system (e.g., computer system 100) to perform method 300.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed. In FIG. 3, acts are shown as being performed within either security zone 109 or security zone 110. Additionally, with respect to security zone 109, acts are shown as being performed within either user mode 109*a* or kernel mode 109*b*.

Figure 3:
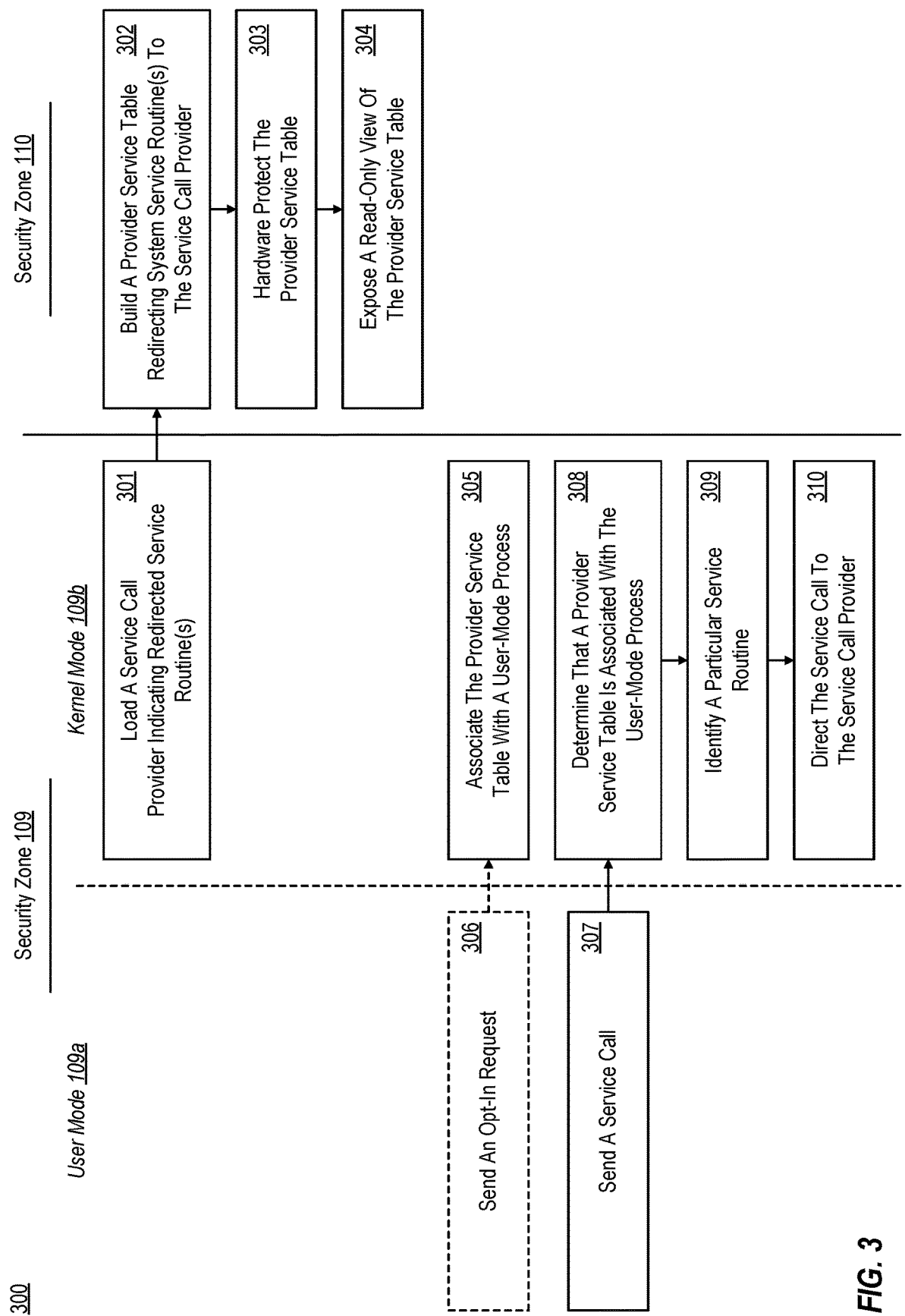
FIG. 3 illustrates a flow chart of an example method for securely redirecting a system service routine via a provider service table.

Referring to FIG. 3, in embodiments, method 300 comprises an act 301 (within kernel mode 109*b* of security zone 109) of loading a service call provider indicating redirected service routine(s). In some embodiments, act 301 comprises loading a service call provider within an operating system executing in a lower trust security zone, the service call provider comprising provider metadata indicating a set of system service routines to be redirected to the service call provider. In an example, the provider loader 201 loads service call provider 113 within the OS kernel 111, which executes in security zone 109. This service call provider 113 includes provider metadata 115, indicating a set of system service routines to be associated with the service call provider 113.

In embodiments, as part of loading the service call provider 113 in act 301, the provider loader 201 verifies the security data 116 contained in the service call provider 113. In embodiments, this verification is accomplished by one, or both, one, or both, of (i) a first portion of the provider loader 201 at the provider manager 112*a* (i.e., within the OS kernel 111), or a (ii) second portion of the provider loader 201 at the provider manager 112*b* (i.e., within the secure kernel 117 and security zone 110). Thus, in some embodiments, act 301 includes verifying security data associated with the service call provider prior to loading the service call provider. As discussed, in embodiments, the security data 116 includes a signature from an issuing authority, an indication of a publishing authority, a signature of a publishing authority, and the like. Thus, in some embodiments of act 301, verifying security data associated with the service call provider comprises verifying at least one of a code signature or a code publisher.

In embodiments, in connection with loading the service call provider 113 in act 301, a portion of the provider loader 201 within the security zone 110 utilizes the memory protector 118 to read-only protect code pages 114 associated with the service call provider 113. Thus, in some embodiments, act 301 includes hardware protecting a code page associated with the service call provider.

In embodiments, in connection with loading the service call provider 113 in act 301, the provider loader 201 verifies the provider metadata 115 (e.g., to ensure that any system service routine specified in the provider metadata 115 corresponds to a valid system service routine, to ensure that any system service routine specified in the provider metadata 115 is permitted to be redirected to a service call provider, to ensure that a function identified in the provider metadata 115 actually exists in the code pages 114, etc.). Thus, in some embodiments of act 301, loading the service call provider includes the secure operating system verifying the provider metadata.

Referring again to FIG. 3, in embodiments, method 300 also comprises an act 302 (within security zone 110) of building a provider service table redirecting system service routine(s) to the service call provider. In some embodiments, act 302 comprises, based at least on a call from the operating system to a secure operating system within a higher trust security zone, building a provider service table redirecting a system service routine in the set of system service routines to the service call provider. In an example, based on a call from a portion of the provider loader 201 in provider manager 112a to portion of the provider loader 201 in provider manager 112b, the service table manager 119 creates the provider service table 122, comprising one or more entries requested by the provider metadata 115.

In embodiments, for at least one system service routine, the provider metadata 115 indicates a function at the service call provider 113 (e.g., within code pages 114) to which the system service routine should be redirected. Thus, in some embodiments, building the provider service table includes generating a first service table entry referencing a first function within the service call provider. In embodiments, for at least one system service routine, the provider metadata 115 indicates that the system service routine should be handled by the OS kernel 111. Thus, in some embodiments, building the provider service table includes generating a second service table entry referencing a second function within an operating system kernel.

Referring again to FIG. 3, in embodiments, method 300 also comprises an act 303 (within security zone 110) of hardware protecting the provider service table. In some embodiments, act 303 comprises, based at least on a call from the operating system to a secure operating system within a higher trust security zone, hardware protecting a memory page associated with the provider service table. In an example, the service table requester 202 operates to read-only protect one or more memory pages associated with provider service table 122, when those memory page(s) are exposed to the OS kernel 111. For example, a portion of the service table requester 202 at the provider manager 112b interacts with the memory protector 118 to read-only protect memory page(s) storing the provider service table 122.

Referring again to FIG. 3, in embodiments, method 300 also comprises an act 304 (within security zone 110) of exposing a read-only view of the provider service table. In some embodiments, act 304 comprises, based at least on a call from the operating system to a secure operating system within a higher trust security zone, exposing a read-only view of the provider service table to the operating system. In an example, the service table manager 119 exposes the provider service table 122 to the OS kernel 111 via one or more read-only protected memory pages.

Technical effects of acts 301-304 include enabling a service call provider 113 to securely initiate creation a provider service table 122 that can be used securely direct service calls from a user-mode process to the service call provider 113, without "hooking" or otherwise modifying a standard service table 121 (e.g., a system service descriptor table).

Referring again to FIG. 3, in embodiments, method 300 also comprises (within kernel mode 109b of security zone 109) an act 305 of associating the provider service table with a user-mode process. In some embodiments, act 305 comprises associating the provider service table with a user-mode process executing in the lower trust security zone. In an example, the service table associator 203 associates the user-mode process 124 with the provider service table 122.

As discussed, a user-mode process may be associated with a provider service table on an opt-in basis (e.g., based on the user-mode process, or any entity that has write access to the user-mode process, making a request to the provider manager 112). For example, method 300 is shown as potentially comprising an act 306 (within user mode 109a of security zone 109) of sending an opt-in request. Thus, in some embodiments of act 305, the provider service table is associated with the user-mode process based on the operating system receiving a call from the user-mode process requesting to opt-in to use of the service call provider.

As discussed, a user-mode process may be associated with a provider service table on a compulsory basis (e.g., based on a decision by the OS kernel 111). Thus, in some embodiments of act 305, the provider service table is associated with the user-mode process based on the operating system determining that the user-mode process will use the service call provider.

As discussed, in some embodiments, the association of a provider service table with a user-mode process is accomplished by updating a data structure associated with the user-mode process (e.g., process information structure 125) to identify the provider service table (e.g., via an array index). Thus, in some embodiments of act 305, associating the provider service table with the user-mode process executing in the lower trust security zone comprises updating a data structure associated with the user-mode process to include an identifier of the provider service table. Technical effects of act 305 include configuring an OS kernel 111 to direct systems calls received from a user mode process to a provider service table 122, rather than to a standard service table 121.

After associating a provider service table (e.g., provider service table 122) with a user-mode process (e.g., user-mode process 124), the dispatcher 123 uses this provider service table when handling service calls from this user-mode process. Thus, in FIG. 3, method 300 also comprises an act 307 (within user mode 109a of security zone 109) of sending a service call (e.g., by the user-mode process 124), and an act 308 (within kernel mode 109b of security zone 109) of determining that a provider service table is associated with the user-mode process. In some embodiments, act 308 comprises, based at least on receiving a service call for a particular system service routine from the user-mode process, determining that the provider service table is associated with the user-mode process. In an example, the user-mode process 124 sends a service call to the OS kernel 111. The OS kernel 111, in turn, uses the dispatcher 123 to process the service call, and the dispatcher 123 determines that provider service table 122 is associated with the user-mode process 124.

As mentioned, in some embodiments, the association of a provider service table with a user-mode process is accomplished by updating a data structure associated with the user-mode process to include an identifier of the provider service table. Thus, in some embodiments of act 308, determining that the provider service table is associated with the user-mode process comprises identifying the provider service table within the data structure associated with the user-mode process.

Referring again to FIG. 3, in embodiments, method 300 also comprises an act 309 (within kernel mode 109b of security zone 109) of identifying a particular service routine. In some embodiments, act 309 comprises, based at least on receiving a service call for a particular system service routine from the user-mode process, identifying the particular system service routine within the provider service table. In an example, the dispatcher 123 identifies a system call routine entry within that provider service table 122 that corresponds to the service call.

Referring again to FIG. 3, in embodiments, method 300 also comprises an act 310 (within kernel mode 109b of security zone 109) of directing the service call to the service call provider. In some embodiments, act 310 comprises, based at least on receiving a service call for a particular system service routine from the user-mode process, directing the service call to the service call provider. In an example, when the system call routine entry identified in act 308 maps to a function within service call provider 113, the dispatcher 123 dispatches the service call to that function.

Technical effects of acts 308-310 include direction of a service call through a provider service table 122 to a service call provider 113, rather than through a standard service table 121 to standard kernel routines.

In some embodiments, the system call routine entry identified in act 308 maps to a function within the OS kernel 111. In these embodiments, the dispatcher 123 dispatches the service call to the OS kernel 111. In other embodiments, the system call routine entry identified in act 308 is configured to according to a policy defined in the provider metadata 115, such as to block, to return failure, to both block and return failure, etc. In these embodiments, the dispatcher 123 applies the policy (e.g., by blocking and/or by returning failure).

Although not expressly illustrated, in some embodiments of method 300, the method also comprises and act of unloading the service call provider, such as in response to a request from service call provider 113. In these embodiments, the provider unloader 204 unloads service call provider 113, as well as provider service table 122. In embodiments, this unloading includes the provider unloader 204 determining that the service call provider is to be unloaded. In embodiments, this unloading also includes, based on determining that the service call provider is to be unloaded, the provider unloader 204 ensuring that no user-mode process is opted-in to use of the service call provider. In embodiments, this unloading includes, after ensuring that no user-mode process is opted-in to use of the service call provider, the provider unloader 204 unloading the service call provider and remove the provider service table.

Accordingly, the secured system service redirection technology described herein enables an operating system to securely reroute operating system service calls to verified service call providers that are registered with the operating system. Service call providers are dynamically and securely loaded into the operating system, and offer value-add services such as system call monitoring, system call filtering, system call sandboxing, anti-malware monitoring, and the like. Embodiments allow verified service call providers to register alternate service tables within an operating system, and ensure that service calls dispatched through these tables are done so in a secure manner, all while leveraging virtualization-based security in order to validate and maintain provider service tables in a tamper-proof manner.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," and "the" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A computer system for securely redirecting a system service routine via a provider service table, comprising:
   a processor; and
   a hardware storage device that stores computer-executable instructions that are executable by the processor to cause the computer system to:
      load a service call provider within an operating system executing in a lower trust security zone, the service call provider comprising provider metadata indicating a set of system service routines to be redirected to the service call provider;
      based at least on a call from the operating system to a secure operating system within a higher trust security zone:
         build a provider service table redirecting a system service routine in the set of system service routines to the service call provider,
         hardware protect a memory page associated with the provider service table, and
         expose a read-only view of the provider service table to the operating system executing in the lower trust security zone;
      associate the provider service table with a user-mode process executing in the lower trust security zone, including updating a data structure associated with the user-mode process to include an identifier of the provider service table; and
      based at least on receiving a service call for a particular system service routine from the user-mode process:
         determine that the provider service table is associated with the user-mode process, including identifying the provider service table within the data structure associated with the user-mode process,
         identify the particular system service routine within the provider service table, and
         direct the service call to the service call provider.

2. The computer system of claim 1, the computer-executable instructions also including instructions that are executable by the processor to cause the computer system to verify security data associated with the service call provider prior to loading the service call provider.

3. The computer system of claim 2, wherein verifying security data associated with the service call provider comprises verifying at least one of a code signature or a code publisher.

4. The computer system of claim 1, the computer-executable instructions also including instructions that are executable by the processor to cause the computer system to hardware protect a code page associated with the service call provider.

5. The computer system of claim 1, wherein building the provider service table includes at least one of:
generating a first service table entry referencing a first function within the service call provider; or
generating a second service table entry referencing a second function within an operating system kernel.

6. The computer system of claim 1, wherein loading the service call provider includes the secure operating system verifying the provider metadata.

7. The computer system of claim 1, wherein the provider service table is associated with the user-mode process based on the operating system receiving a call from the user-mode process requesting to opt-in to use of the service call provider.

8. The computer system of claim 1, wherein the provider service table is associated with the user-mode process based on the operating system determining that the user-mode process will use the service call provider.

9. The computer system of claim 1, the computer-executable instructions also including instructions that are executable by the processor to cause the computer system to:
determine that the service call provider is to be unloaded;
based on determining that the service call provider is to be unloaded, ensure that no user-mode process is opted-in to use of the service call provider; and
after ensuring that no user-mode process is opted-in to use of the service call provider, unload the service call provider and remove the provider service table.

10. A method, implemented at a computer system that includes a processor, for securely redirecting a system service routine via a provider service table, the method comprising:
loading a service call provider within an operating system executing in a lower trust security zone, the service call provider comprising provider metadata indicating a set of system service routines to be redirected to the service call provider;
based at least on a call from the operating system to a secure operating system within a higher trust security zone:
building a provider service table redirecting a system service routine in the set of system service routines to the service call provider,
hardware protecting a memory page associated with the provider service table, and
exposing a read-only view of the provider service table to the operating system executing in the lower trust security zone;
associating the provider service table with a user-mode process executing in the lower trust security zone, including updating a data structure associated with the user-mode process to include an identifier of the provider service table; and
based at least on receiving a service call for a particular system service routine from the user-mode process:
determining that the provider service table is associated with the user-mode process, including identifying the provider service table within the data structure associated with the user-mode process,
identifying the particular system service routine within the provider service table, and
directing the service call to the service call provider.

11. The method of claim 10, further comprising verifying security data associated with the service call provider prior to loading the service call provider.

12. The method of claim 11, wherein verifying security data associated with the service call provider comprises verifying at least one of a code signature or a code publisher.

13. The method of claim 10, further comprising hardware protecting a code page associated with the service call provider.

14. The method of claim 10, wherein building the provider service table includes at least one of:
generating a first service table entry referencing a first function within the service call provider; or
generating a second service table entry referencing a second function within an operating system kernel.

15. The method of claim 10, wherein loading the service call provider includes the secure operating system verifying the provider metadata.

16. The method of claim 10, wherein the provider service table is associated with the user-mode process based on the operating system receiving a call from the user-mode process requesting to opt-in to use of the service call provider.

17. The method of claim 10, wherein the provider service table is associated with the user-mode process based on the operating system determining that the user-mode process will use the service call provider.

18. The method of claim 10, further comprising:
determining that the service call provider is to be unloaded;
based on determining that the service call provider is to be unloaded, ensuring that no user-mode process is opted-in to use of the service call provider; and
after ensuring that no user-mode process is opted-in to use of the service call provider, unloading the service call provider and removing the provider service table.

19. A computer program product comprising a hardware storage device that stores computer-executable instructions that are executable by a processor to cause a computer system to securely redirect a system service routine via a provider service table, the computer-executable instructions including instructions that are executable by the processor to cause the computer system to:
load a service call provider within an operating system executing in a lower trust security zone, the service call provider comprising provider metadata indicating a set of system service routines to be redirected to the service call provider;
based at least on a call from the operating system to a secure operating system within a higher trust security zone:
build a provider service table redirecting a system service routine in the set of system service routines to the service call provider,
hardware protect a memory page associated with the provider service table, and
expose a read-only view of the provider service table to the operating system executing in the lower trust security zone;
associate the provider service table with a user-mode process executing in the lower trust security zone, including updating a data structure associated with the user-mode process to include an identifier of the provider service table; and based at least on receiving a service call for a particular system service routine from the user-mode process:
  determine that the provider service table is associated with the user-mode process, including identifying the provider service table within the data structure associated with the user-mode process,
  identify the particular system service routine within the provider service table, and
  direct the service call to the service call provider.

20. The computer program product of claim 19, the computer-executable instructions also including instructions that are executable by the processor to cause the computer system to hardware protect a code page associated with the service call provider.

* * * * *